(No Model.)

J. B. HOAGLAND.
TRACK CLEARER.

No. 381,072.  Patented Apr. 10, 1888.

Witnesses.  Inventor.
Jas A Ryan  John B. Hoagland.
J W Garner  By his Attorneys

UNITED STATES PATENT OFFICE.

JOHN B. HOAGLAND, OF NASHVILLE, TENNESSEE, ASSIGNOR OF ONE-HALF TO E. F. MEACHAM, OF SAME PLACE.

TRACK-CLEARER.

SPECIFICATION forming part of Letters Patent No. 381,072, dated April 10, 1888.

Application filed July 29, 1887. Serial No. 245,608. (No model.)

*To all whom it may concern:*

Be it known that I, JOHN B. HOAGLAND, a citizen of the United States, residing at Nashville, in the county of Davidson and State of Tennessee, have invented a new and useful Improvement in Track-Clearers, of which the following is a specification.

My invention relates to an improvement in track-clearers for street-railway cars; and it consists in the peculiar construction and combination of devices, that will be more fully set forth hereinafter, and particularly pointed out in the claims.

Figure 1:
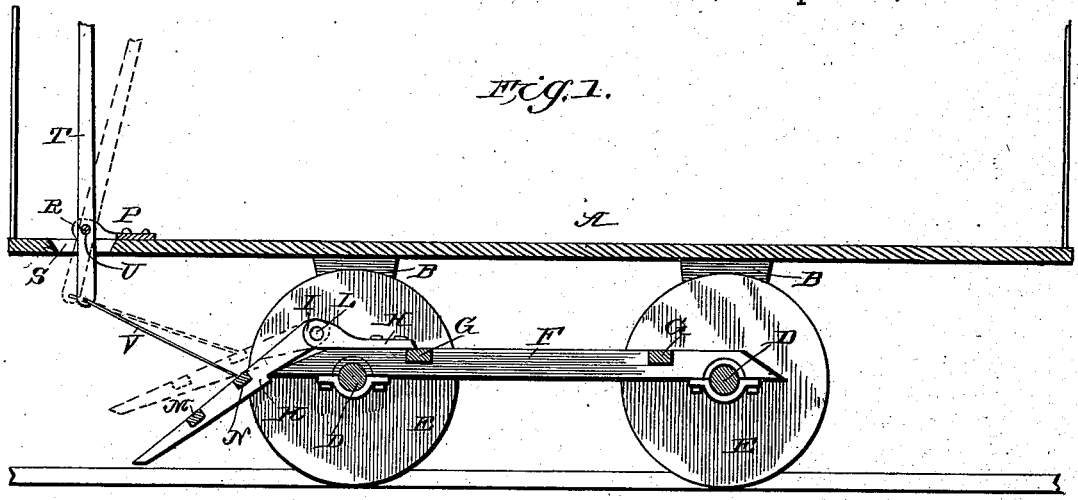
Figure 2:
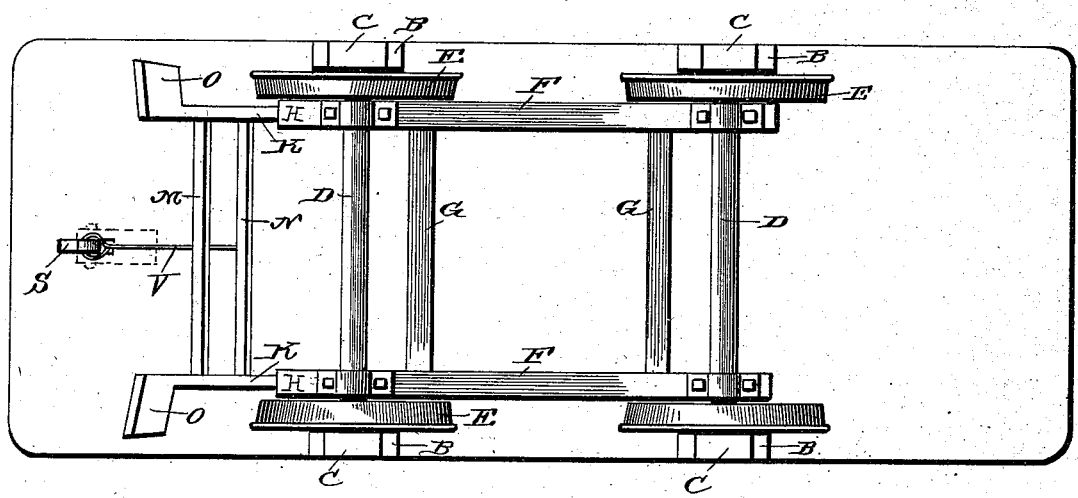

In the accompanying drawings, Figure 1 is partly an elevation and partly a vertical longitudinal sectional view of a street-railway car provided with my improved track-clearing device. Fig. 2 is a bottom plan view of the same.

A represents the platform of the car, from opposite sides of which depend hangers B, having vertical open slots which fit bearing-boxes C.

D represents the car-axles, which are journaled in the bearing-boxes C, and are provided with the usual flanged wheels, E.

F represents a pair of horizontal bars which are provided on their under sides, near their ends, with semicircular openings which fit on the upper sides of the axles. Suitable bearing sleeves or boxes are fitted in the said openings to prevent wear. The side beams, F, are connected near their extremities by a pair of cross-bars, G, which serve to keep the side beams in place. On the upper sides of the bars, at one end of the same, are bolted a pair of plates, H, the outer ends of which project beyond the ends of bars F, and are bifurcated to form ears I.

K represents a pair of arms which have their upper ends inserted between the ears and pivoted on bolts L, that extend transversely through them and through openings in the ears. These arms are thus hinged to the running gear of the car, and are adapted to be swung in a vertical plane, and thereby lowered to the track or raised from the same.

M represents a bar which connect the arms K near their lower ends, and N represents a similar bar which connects said arms near their upper ends. The lower ends of the arms K are arranged obliquely and extend laterally, as shown, so as to be adapted to rest over the tops of the tracks and form fenders O, which are adapted to throw obstructions from the track outwardly and prevent the wheels from passing over the same.

P represents a metallic plate which is bolted on the platform of the car near one end, and is provided near its upper end with a pair of ears, R, the space between the said ears registering with an opening, S, that is made in the car-platform.

T represents a lever which extends through the opening S and is fulcrumed on a bolt, U, that passes through the ears R. The lower end of this lever is connected to the bar N by means of a rod, V.

The operation of my invention is as follows: The arms K are normally in the position shown in Fig. 1, with the fenders at their lower ends raised a very slight distance above the tracks, so as to clear the latter of obstruction. In the event of the car going off the track, or when passing switches, the lever T is turned so as to raise the fenders from the track, as illustrated in dotted lines in Fig. 1.

Having thus described my invention, I claim—

1. The combination of the car-platform having the depending hangers B, the car-axles provided with the bearing-boxes attached to the hangers, said axles having the wheels E, the beams F, connecting the said axles and bearing thereon, cross-bars connecting the said beams, and the fenders pivotally connected to the beams F and adapted to clear the track of obstructions in advance of the wheels, substantially as described.

2. The combination, with a car, of the truck-beams F, the plates H, bolted to the top portion of the said beams F, the arms K, having their upper ends pivoted in said plates H and their lower ends arranged obliquely and extended laterally to form fenders O, the lower brace, M, the upper brace, N, the rod V, connected to the upper brace, N, and the lever T, connected at its lower end to the rod V and extending up through the platform of the car, substantially as described.

In testimony that I claim the foregoing as my own I have hereto affixed my signature in presence of two witnesses.

JOHN B. HOAGLAND.

Witnesses:
T. J. LEE,
F. A. DRAPER.